(12) United States Patent
Wang et al.

(10) Patent No.: US 11,501,177 B2
(45) Date of Patent: Nov. 15, 2022

(54) KNOWLEDGE ENGINEERING AND REASONING ON A KNOWLEDGE GRAPH

(71) Applicant: Accenture Global Solutions Limited, Dublin (IE)

(72) Inventors: Zhijie Wang, Fremont, CA (US); William Richard Gatehouse, East Grinstead (GB); Teresa Sheausan Tung, Tustin, CA (US)

(73) Assignee: Accenture Global Solutions Limited, Dublin (IE)

( * ) Notice: Subject to any disclaimer, the term of this patent is extended or adjusted under 35 U.S.C. 154(b) by 406 days.

(21) Appl. No.: 16/900,369

(22) Filed: Jun. 12, 2020

(65) Prior Publication Data

US 2020/0394529 A1  Dec. 17, 2020

Related U.S. Application Data

(60) Provisional application No. 62/861,497, filed on Jun. 14, 2019.

(51) Int. Cl.
*G06N 5/02* (2006.01)
*G06N 20/00* (2019.01)
*G06K 9/62* (2022.01)

(52) U.S. Cl.
CPC ............ *G06N 5/02* (2013.01); *G06K 9/628* (2013.01); *G06K 9/6215* (2013.01); *G06K 9/6277* (2013.01); *G06K 9/6296* (2013.01); *G06N 5/022* (2013.01); *G06N 20/00* (2019.01)

(58) Field of Classification Search
CPC .......... G06N 5/02; G06N 5/022; G06N 20/00; G06N 5/046; G06K 9/6215; G06K 9/6277; G06K 9/628; G06K 9/6296
See application file for complete search history.

(56) References Cited

U.S. PATENT DOCUMENTS

| | | | |
|---|---|---|---|
| 10,296,524 B1 | 5/2019 | Tung et al. | |
| 10,387,798 B2 | 8/2019 | Duggan et al. | |
| 10,438,132 B2 | 10/2019 | Duggan et al. | |
| 10,614,086 B2 | 4/2020 | Tung et al. | |
| 10,614,375 B2 | 4/2020 | Duggan et al. | |
| 2015/0235143 A1* | 8/2015 | Eder ..................... | G16Z 99/00 706/12 |
| 2018/0032038 A1 | 2/2018 | Kang et al. | |
| 2018/0150750 A1* | 5/2018 | Verdejo ................. | G06V 10/84 |
| 2018/0189634 A1* | 7/2018 | Abdelaziz .............. | G06N 3/04 |
| 2018/0367549 A1* | 12/2018 | Jang ....................... | G06N 20/00 |
| 2019/0155961 A1* | 5/2019 | Alonso .................. | G06N 5/022 |
| 2019/0327331 A1* | 10/2019 | Natarajan ............. | H04L 43/0882 |
| 2020/0034375 A1 | 1/2020 | Tung et al. | |
| 2020/0050604 A1 | 2/2020 | Tung et al. | |

OTHER PUBLICATIONS

U.S. Appl. No. 16/743,130, filed Jan. 15, 2020.

(Continued)

*Primary Examiner* — Mazda Sabouri
(74) *Attorney, Agent, or Firm* — Crowell & Moring LLP

(57) ABSTRACT

A model management tool is provided for performing analysis on data in a knowledge graph representation and enforcing data standardization to increase performance when reusing existing models to develop new artificial intelligence applications.

20 Claims, 4 Drawing Sheets

(56) References Cited

OTHER PUBLICATIONS

Ratner, et al., "Weak Supervision: A New Programming Paradigm for Machine Learning," Mar. 10, 2019, http://ai.stanford.edu/blog/weak-supervision/, visited Jun. 12, 2019.
Palkar, et al., "Weld: A Common Runtime for High Performance Data Analytics," 8th Biennial Conference on Innovative Data Systems Research (CIDR '17) Jan. 8-11, 2017.

* cited by examiner

KNOWLEDGE ENGINEERING AND REASONING ON A KNOWLEDGE GRAPH

PRIORITY

This application claims priority to U.S. Provisional Patent Application No. 62/861,497, filed Jun. 14, 2019, and entitled Knowledge Engineering and Reasoning on a Knowledge Graph, which is incorporated by reference in its entirety.

TECHNICAL FIELD

Complex computer system architectures are described for providing a system and implementing a set of methodology to facilitate resources to perform analysis on data included in a knowledge graph representation and enforce data standardization to increase knowledge reuse in production of analytical models.

BACKGROUND

Artificial intelligence (AI) has seen rapid development and adoption, where AI models may utilize deep learning methods. Such deep learning methods often follow an "end-to-end" design philosophy which emphasizes minimal a priori representational and computational assumptions and seeks to avoid explicit structure and "hand-engineering". This approach can be found effective in open domain problems or general tasks, given the exponential growth in available data and parallel computational capabilities.

DETAILED DESCRIPTION

Figure 1:
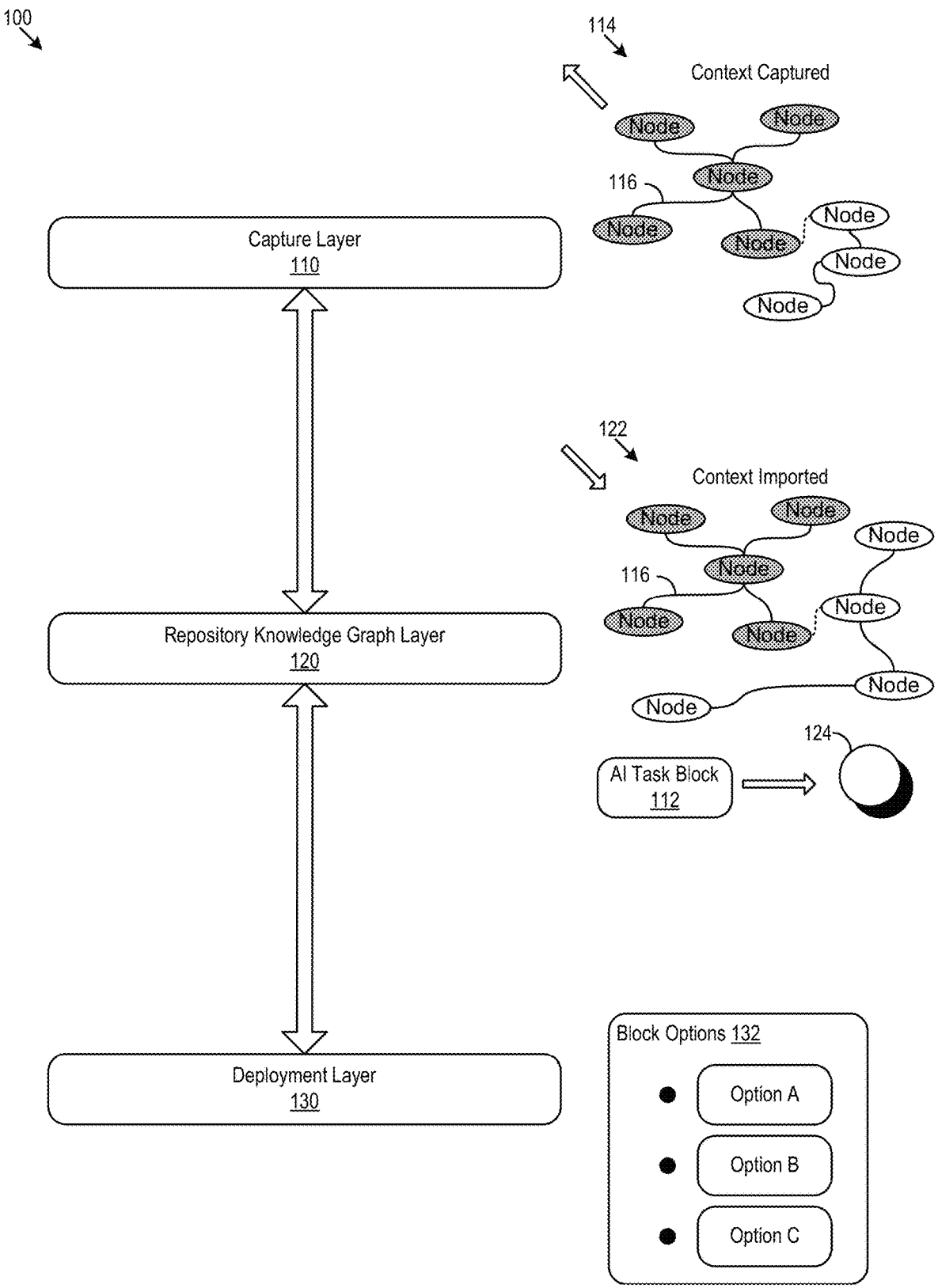
FIG. 1 shows an example model repository stack.

In some cases, AI applications may face challenges. For example, AI applications may lack access to specific data to ingest into the AI applications to produce relevant results. For example, when training AI applications for an aircraft engine failure model, there may be than one thousand aircraft failure cases from trillions of records relating to aircraft flight records. However, data mining without any prior knowledge about the problems trying to be solved by the machine learning is a brute force method of gathering data that may not result in accurate or even usable results. Therefore, inputting more knowledge for "smart" data mining is a factor to produce more accurate and efficient ML models, which may result in noticeable performance improvements and improve user experience by streamlining application execution.

To address the technical problems that come with a lack of relevant data to feed into machine learning (ML) models that are implemented during the production of an end-to-end AI application, a model repository stack is described. The model repository stack may be implemented to achieve a master data management process for managing critical data for an enterprise.

The model repository stack may, in some cases, standardize enterprise intelligence and knowledge, and captures the data into a machine readable format which allows ML models to perform reasoning and analysis on the data. The model manager (MM) tool operates to utilize machine learning as more of a fundamental step by finding correlations and insights within the data, assembled using knowledge and reasoning provided by automated machine learning techniques, human input, or a combination of both.

The ML models (which may be stored and cataloged as AI task blocks) being managed by the model repository stack may be utilizing knowledge graphs, where the knowledge graph is an information storage and retrieval system that captures rich data and knowledge from various sources. The knowledge graph may have: 1) the capability to link data, and 2) semantic schema for personalizing the construction of the data included in the knowledge graph. Storing links or data connections may allow for a detailed and exploratory analysis of a small set of data of interest and the ability to explore the interaction of different AI task blocks. The knowledge graph may combine data storage with semantic schema that includes expressive reasoning (either by operator query or by machine auto-reasoning).

Accordingly, the model repository stack may provide a link between human descriptions of an (in some cases, complex and/or multi-part) AI application and machine descriptions of such an AI application. Thus, the system may better apply machine reasoning to identify ML models (or other AI task blocks) to serve as constituent parts of the end-to-end AI application. This increases AI development efficiency because machine selection of input AI task blocks is more accurate—resulting in shorter AI training periods.

Referring now to FIG. 1, an example model repository stack 100 is shown. The example model repository stack 100 may include a capture layer 110 that may handle context and data capture for AI task blocks 112 from existing AI application projects (e.g., for an enterprise or other entity), a repository graph layer 120 that may classify, contextualize, and govern storage of AI task blocks 112, and a deployment layer 130 which may provide AI task block options 132 (e.g., from among those stored/classified by the repository graph layer 120) in response to queries associated with AI application development.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the model repository stack, the capture layer may provide the repository graph layer with knowledge graph traversal and capture operations performed via network interface circuitry resources. Hence, the capture layer may provide an access resource via hardware, e.g., network interface circuitry resources, to the repository graph layer. Accordingly, the multiple-layer stack architecture of the coordination stack may improve the functioning of the underlying hardware by regulating the flow and usage of hardware resources.

Figure 2:
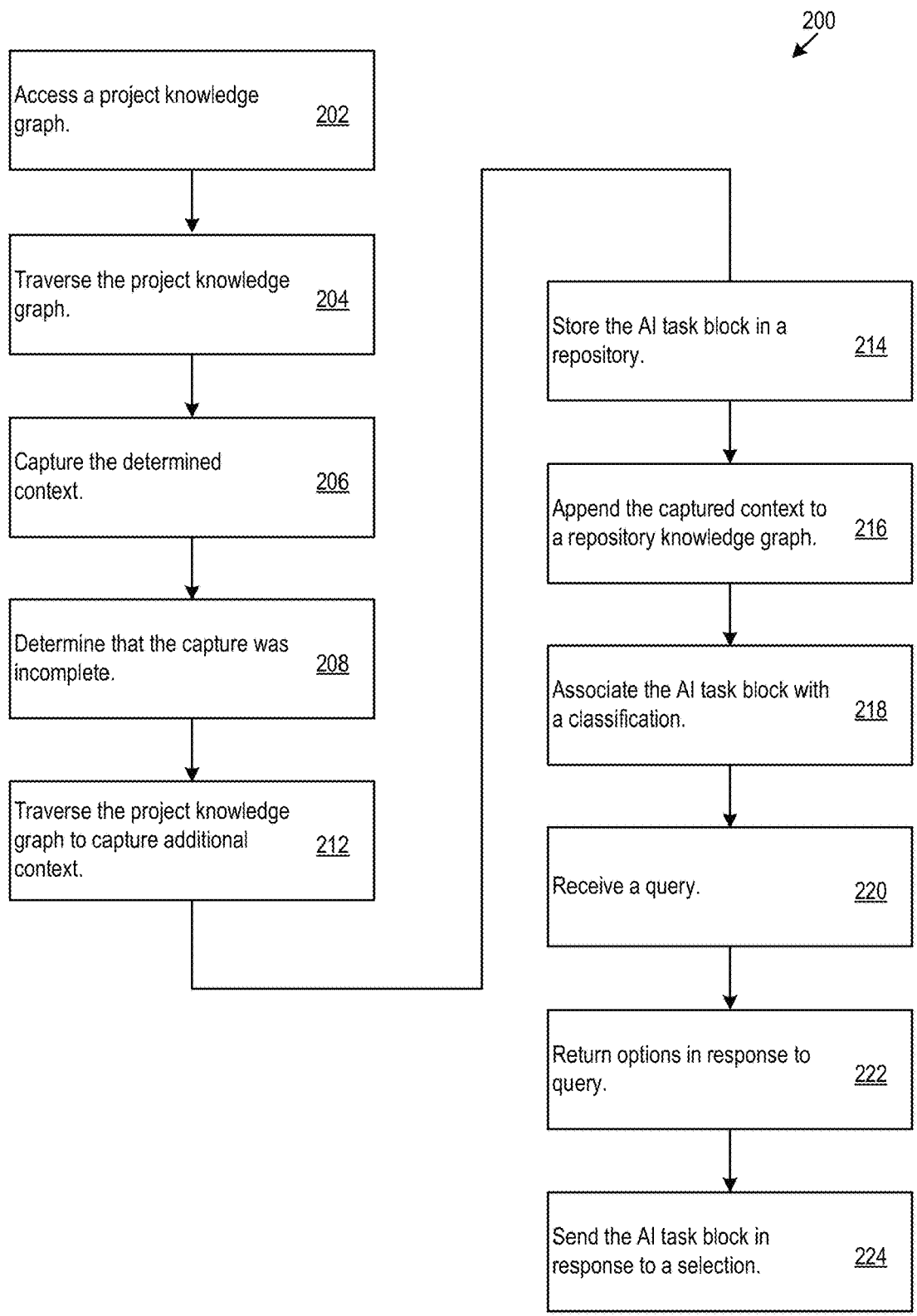
FIG. 2 shows example model repository logic.

While continuing to refer to FIG. 1, FIG. 2 shows example model repository logic (MRL) 200, which may be used to implement the repository stack (e.g., on circuitry). The MRL 200 may access (e.g., using network interface circuitry) a project knowledge graph 114 (202) using the capture layer 110 of the model repository stack 100. The project knowledge graph 114 may include a knowledge graph used to map the operation and resources (e.g., the context) of an existing AI application. The existing AI application may be made up of one or more AI task blocks. The AI task blocks may include code such as AI tools, ML models, or other "smart" computer code. The project knowledge graph 114 may include nodes and/or edges detailing the operation (for example, inputs, outputs, translation operations, or other operations and/or requirements of the AI task blocks). For example, the project knowledge graph 114 may have nodes representing tasks performed within the AI application with an edge 116 connecting the node representing the task to an AI task block node representing the AI task block used to perform the task. Hence, the knowledge graph may show how the existing AI application may be deconstructed into AI task blocks.

To add a specific AI task block from an existing AI application to the repository maintained by the model repository stack 100, the MRL 200 may (using classification circuitry) traverse the project knowledge graph to determine the specific context (e.g., the resources used, the input to the AI block, the output from the AI task block, and the translation done by the AI task block) of the AI task block (204).

After the specific context is determined, the MRL 200 (e.g., while operating at the capture layer 110) may capture the determined context (206). In some cases, after capturing the context determined in a round of capture, the MRL 200 may determine that the capture was incomplete (e.g., a (less-than whole) portion of the context was captured) (208).

The MRL 200 (e.g., while operating at the model repository layer) may determine that the context was incomplete by applying a descriptor rule. Descriptor rules, may be rules that guide formation of knowledge graphs to represent AI applications and/or stored AI task blocks. Descriptor rules may ensure that descriptions and information on the AI applications and AI task blocks is complete (e.g., fully contextualized) and (in some cases) ensures that knowledge graphs (or portions thereof) for new AI applications and/or AI task blocks (e.g., within a repository) are comprehensible by operators and/or developers.

As an example, a descriptor rule may include a requirement of completeness. In an example scenario, the MRL 200 (e.g., while operating at the repository graph layer) may determine that the context was incomplete based on missing information identified based on captured information. For example, an AI task block may accept inputs, translate the inputs, and generate an output. Accordingly, if the captured context includes an input, the MRL 200 may search the captured context for a corresponding translation and/or corresponding output. Similarly, the MRL 200 may search for an input and output if a translation is found, and an input and/or a translation if an output if sound (e.g., to complete a tuple). Other tuples may be possible, for example, source/destination, input/output, source/path/destination, input/states, or other tuples.

When the capture is determined to be incomplete, the MRL 200 traverse (e.g., re-traverse and/or continue to traverse) the knowledge graph to capture additional context (212). For example, the MRL 200 may capture additional context to complete incomplete tuples, as discussed above. In some cases, the traversal for completion may include pre-determined context location strategies. For example, the MRL 200 may traverse the project knowledge graph from one member of a tuple (e.g., a previously captured member) to other not previously captured members of the tuple. As an illustrative example, the MRL 200 may traverse the project knowledge graph from a node representing an input of an AI task block to a previously undiscovered corresponding output of the AI task block.

The MRL 200 may further store the AI task block in a repository 124 (214). A repository may include a database, cloud storage, and/or other storage system for code.

The MRL 200 may append the captured context from the project knowledge graph to a repository knowledge graph 122 (216) to import the captured context. Accordingly, the context for operation/incorporation of the AI task block may be transferred from the origin of the AI task block and included in the repository graph to facilitate reuse/reimplementation of the AI task block in other AI applications.

The import of the context may occur in one or more stages. For example, when the context is captured through multiple traversals of the project knowledge graph, the import may, in some cases, have a stage for each of the traversals. However, in some cases, import may be held until capture completes, even when multiple traversals are used. In some cases, multiple stages of import may have the effect of expanding the imported context from an initial import to a final expanded/complete import.

Additionally or alternatively, the MRL 200 may repeat (e.g., successively or in parallel) the capture, storage, and import for multiple AI task blocks, which may be present in an AI application and represented in a corresponding project knowledge graph.

The MRL 200 (e.g., continuing to operate at the repository graph layer 120) may associate the AI task block with a classification (218). The classification may be based on the task performed by the AI task block, details from the capture context for the AI task block, and/or other details regarding the nature of the AI task block.

In various implementations, the classification (e.g., the definition of the classification) may be expanded to include the AI task block. In other words, the coverage of the classification may be increased to accommodate the classification. In an illustrative example, the AI task block may take livestock type and age data as inputs and generate peak-weight-to-expended-feed-ratio data as an output. The classification prior to inclusion of the AI task block may be defined to include livestock life expectancy AI models. However, this classification may be the closest existing classification. In some cases, instead of creating a new classification. The existing classification may be expanded. For example, the livestock life expectancy classification may be expanded to a livestock lifecycle classification including both life expectancy and other expected life events. Accordingly, the expanded classification may include both the members of the existing classification and the new AI task block.

In some cases, the expansion of a classification may be implemented through super-classing. Super-classing may include creating a new classification that corresponds to the expanded classification and including the existing classification as a subclass of the new super-class. The new AI task block may also be included in the super-class. In some cases, properties of the new super-class may be forward-inherited by members of the super-class, for example, the existing class that became a subclass and the new AI task block. Forward-inheritance may include inheritance of properties/parameters downward along a class hierarchy. In other words, for forward-inheritance, members of class inherit the properties/parameters of the class.

Additional or alternatively, during execution of super-classing (e.g., when a super-class is created) the super-class being created may reverse-inherit properties/parameters from the members of the super-class. For example, when a super-class is created to effectively expand an existing class, the super-class may reverse-inherit properties/parameters from the existing class at the time of creation of the super-class. In other words, for reverse-inheritance, classes may inherit properties/parameters from the members of the class.

In some cases, the super-class may reverse-inherit some properties/parameters from the existing class but may not necessarily reverse-inherit all of the properties/parameters from the existing class. For example, some properties/parameters may be incompatible with the new AI task block (e.g., as determined based on the task performed by the AI task block, the context of the AI task block, and/or both). Accordingly, the super-class may not necessarily be able to properly house the new AI task block if all properties/parameters are reverse-inherited by the super-class. Accordingly, in some cases the MRL 200 may determine that some properties/parameters may be reverse-inherited while other properties/parameters may not necessarily reverse-inherited.

At the deployment layer 130, the MRL 200 may receive a query requesting an AI task block (220). The query may include descriptors of the task to be performed, inputs, outputs, or other context for determination of a suitable AI task block for a project. The MRL 200 may compare the query (e.g., the descriptors therein) to various contexts corresponding to various AI task blocks in the repository. In some cases, the AI task blocks selected for comparison may be AI task blocks from the same classification. Accordingly, AI task blocks from a selected classification may be evaluated in the comparison. In some cases, this may reduce the workload by constraining the number of AI task blocks involved in the comparison.

In some implementations, the query may include knowledge graph structure. In some cases, the comparison may include a structural comparison between the knowledge graph structure in the query and structures containing the context that corresponds to the various AI task blocks.

Based on the comparison, the MRL 200 may determine one or more options for AI task blocks that may fulfil the query. The MRL 200 may return the one or more options in response to the query (222). Responsive to a received selection of one or more of the options, the MRL 200 may send the corresponding AI task block(s) for deployment (224).

Figure 3:
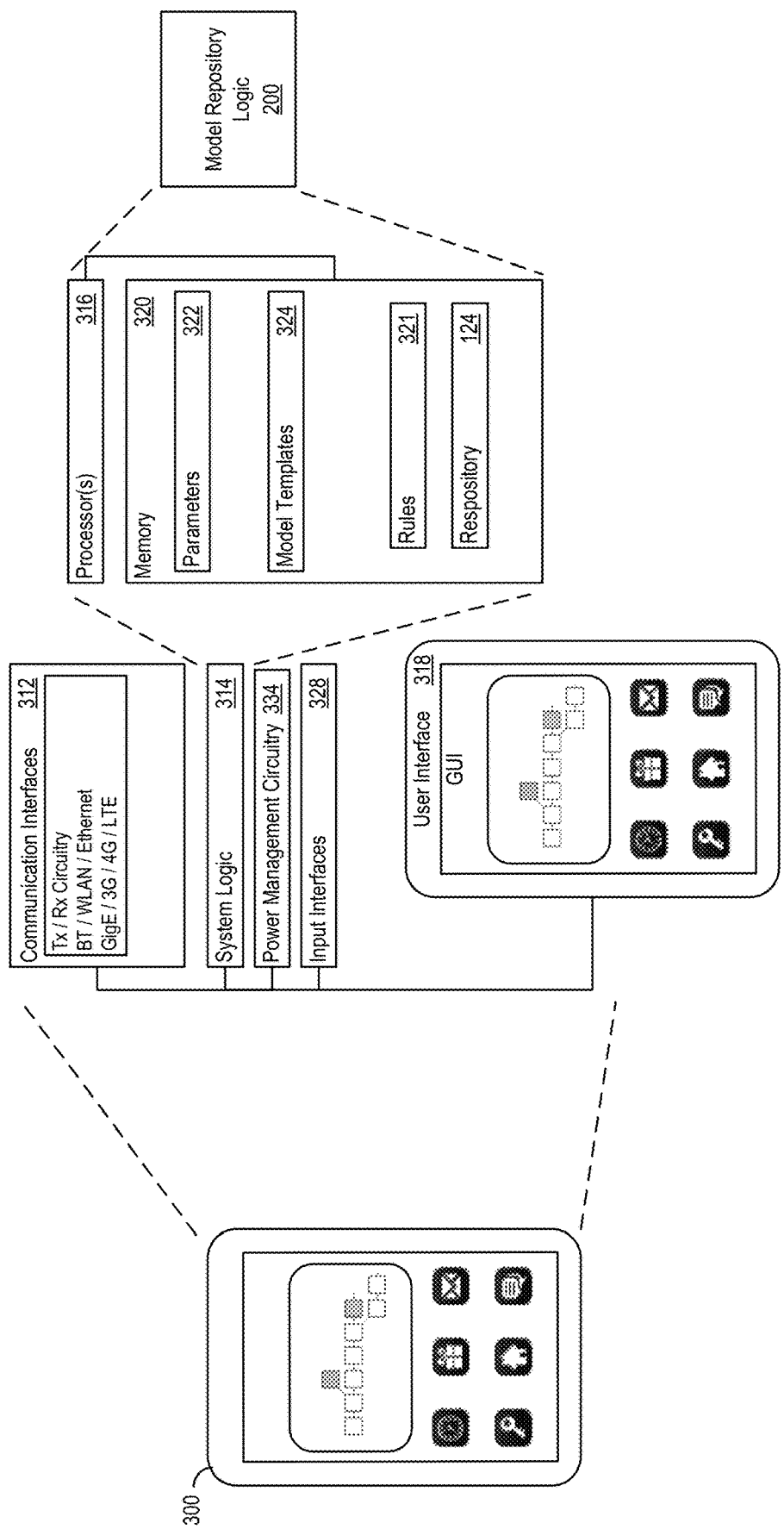
FIG. 3 shows an example model repository execution environment.

FIG. 3 shows an example model repository execution environment (MREE) 300 which may be implemented as circuitry. The MREE 300 may include system logic 314 to support tasks described in the disclosure, such as knowledge graph traversal, context capture, AI task block storage, context import, AI task block classification, AI task block deployment, and/or other tasks. The system logic 314 may include processors 316, memory 320, and/or other circuitry, which may be used to implement MRL 200, which may provide software support to implement the various tasks performed by the MRL 200 (e.g., to transform the MREE 300 (at least in part) into specialized circuitry). In various implementations, the MREE 300 may include a mobile device. Further, in some implementations, the memory (which may be distributed and/or include multiple storage paradigms) may provide storage for the repository 124.

The memory 320 may be used to store parameters 322 and/or model templates 324 used in the AI task block management. The memory 320 may further store rules 321 that may facilitate AI task block management and/or the execution of other tasks.

The memory 320 may further include applications and structures, for example, coded objects, templates, or one or more other data structures to facilitate tasks such as knowledge graph traversal, context capture, AI task block storage, context import, AI task block classification, AI task block deployment, and/or other tasks. The MREE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the communication layer as network interface circuitry, with data sources or resources used to facilitate tasks, such as knowledge graph traversal, context capture, AI task block storage, context import, AI task block classification, AI task block deployment, and/or other tasks. Additionally or alternatively, the communication interface 312 may support secure information exchanges, such as secure socket layer (SSL) or public-key encryption-based protocols for sending and receiving private data associated with the AI task blocks. The MREE 300 may include power management circuitry 334 and one or more input interfaces 328.

The MREE 300 may also include a user interface 318 that may include man-machine interfaces and/or graphical user interfaces (GUI). The GUI may be used to present interfaces and/or options to facilitate tasks, such as, knowledge graph traversal, context capture, AI task block storage, context import, AI task block classification, AI task block deployment, and/or other tasks.

Example Implementations

In various example implementations, the knowledge graphs traversed by the capture layer or maintained by the repository graph layer may be any one or more of the knowledge graphs described in U.S. patent application Ser. Nos. 16/198,237; 16/047,573; or 16/393,296, all of which are incorporated by reference herein.

The example implementations (discussed below) are included for the purposes of example illustration of the techniques and architectures discussed. The principles illustrated in the example implementations may be applied separately, combined, or in different contexts from those of the example implementation.

In an example implementation, relational reasoning can be expressed via network layer selection/encoding. The example system may express building blocks of reasoning via either human inputs or machine learning. Building blocks communicates via protocol (both data value and data definition). This decoupling of reasoning blocks allows each component to be evolved independently.

A machine learning system may perform poorly when not enough data is present. Using rule-based expression can help system to perform proper reasoning, for critical missing links. The implementation of the rule can be deterministic, first order logic or as input for triggering machine learning. The definition of a rule is a transformation logic, transforming a set of input entities via a set of logic to a set of output new entities. The logic can filter options based on properties, edge type, edge properties, or other knowledge graph inputs. The transformation logic provides information gain.

Certain information and AI model update and retraining can be handled automatically, such as that discussed in U.S. patent application Ser. No. 16/743,130 filed Jan. 15, 2020, and incorporated by reference herein. The logic may apply a certain set of reasoning and ontology resolution to maintain the correctness of Knowledge Graph schema and model, such as Super Classing. For example, the system may have support for type Dog. To add support for Cat, the system can define <Super Class> Animals to capture the common part of Dog/Cat AI task blocks and using inheritance/subclass to support unique properties. The original model, modularized and componentized, can still be reusable. The building blocks that rely on Animal attributes can be kept/renamed and updated to accept correct types; and the type that relies on Dog specific attributes can update data input definitions.

Example Machine Learning System

Graph Layer

Graph system can be implemented with native graph database (databases that supporting graph query only, such as Neo4j), multi-modal graph database (ArrangoDB, DataStax, databases that offer graph query as one of its capabilities), and/or other database systems. In various implementations, functions of the graph layer in the example machine learning system may be implemented at the capture 110 and/or repository graph 120 layers, discussed above.

AI Task Block Management

This can either be provided natively by the graph system (such as the virtual graph) or as an independently implemented component. AI task block management defines the relationship between AI task block, expressed either as filter/rules or models.) In various implementations, AI task block management functions in the example machine learning system may be implemented at the repository graph 120 layer, discussed above.

Automatic Reasoner

When user performs certain reasoning, the system can check with existing known entities and reasoning steps. This can increase knowledge re-use by prompting user to use existing building blocks or replace same set of result via a formatted query. In various implementations, automatic reasoner functions in the example machine learning system may be implemented at the repository graph 120 layer (e.g., using the classification circuitry), discussed above.

Knowledge Engineering Portal (KEP)

The KEP serves as an interface for operators to perform reasoning and edits of knowledge graph and entity definition. Analytical results and process in KEP may be translated into AI steps. In various implementations, the interface functions of the KEP may be supported via operator interactions at the capture 110, repository graph 120, and/or deployment 130 layers, discussed above.

Machine Learning Model Repository and Orchestration

Responsible for storing machine learning or statistical models. Model can be executed via step by step orchestration, or, for performance reasons, compiled into executable binaries (interpreted data processing vs compiled data processing). The machine learning repository also maintain records of AI Task Block type produced by the model step. In various implementations, repository and orchestration functions in the example machine learning system may be implemented at the repository graph 120 and/or deployment layers, discussed above.

Compute Execution

This may include the collections of compute resources used to implement filter and or reasoner computations. Compute execution may draw from circuitry (e.g., the MREE 300, discussed above, or other circuitry resources) to obtain computation resources for execution of the computation.

Figure 4:
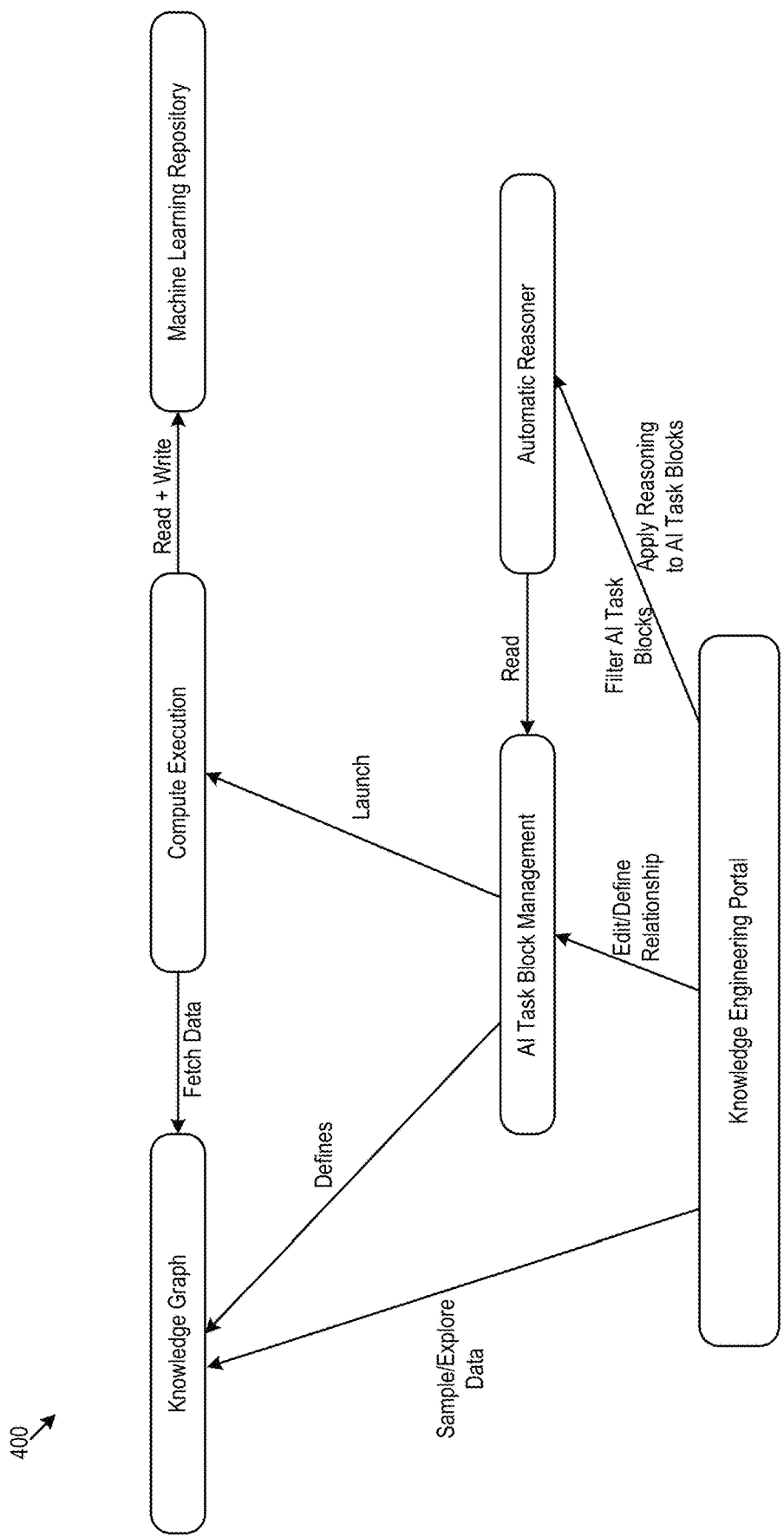
FIG. 4 shows example logic for the interaction of the example machine learning system components.

FIG. 4 shows example logic 400 for the interaction of the example machine learning system components.

Model manager allows for decoupling of the computational model components. In other words computational modes (e.g., AI applications) may be broken down into steps and provide orchestration as ModelOps (e.g., tasks).

This system extends the orchestration capability with out-of-order execution for performance optimization—given the semantic context of each AI task block type, the orchestrator can analyze data distribution statistics, to optimize for a set of objective function (I/O, throughput, latency, and/or other performance metrics). This capability depends on implementation of Machine Learning Repositories to capture attributes used in computation.

Often non-optimized data fetch queries are reused in production systems. Further optimization, such as dropping attributes can be applied given analysis of logical reasoning code. This system achieves optimization via reasoning about desired outcomes, removing unnecessary data fetch or computations. The two techniques can co-operate to achieve improved performance.

The system provides interfaces and capability to perform declarative reasoning on knowledge graph and data from source systems.

Using declarative interfaces allow users to specify what they want without calling for the provision of in-depth computational detail. An SQL query can be used to compare against first order logic reasoning. Table 1 shows two example pseudocode queries.

TABLE 1

Two example pseudocode queries.

| SQL | First order logic |
| --- | --- |
| CREATE VIEW Manager AS SELECT * FROM Employees WHERE level ≤7 | All employees whose level is ≤7 are Managers. |

In the examples in Table 1, employees may be assigned a level based on a rank in an enterprise. In the examples, a chief executive may be assigned a level of 1, a manager may be assigned a level of 7, and a analyst (or other employee without management responsibilities) may be assigned a 13. The two queries look the same, as the human brain is able to properly interpret. This is because "Manager" is a registered concept in human knowledge. To compute, the SQL query could replace the "Manager" identifier with any arbitrary keyword, and the statement still holds true. Even further, the query can be modified to be an insertion query to an arbitrary table of any name, commingled with any other type irrelevant data, as long as the column types match.

First order logic as declarative reasoning queries imposes a certain set of constraints in AI task blocks and names that are allowed. This set of entities, names, relationships are managed in the AI task block Management system and can be modified (Create, Update, Deleted, Read).

This enforcement in constraints allows standardization and establishes a common ground of information exchange between parties, departments or organizations.

The reasoning steps can be translated to two types of data processing. The systematic translation for and assistance to an operator performing the intended reasoning task can help offload the cognitive workload and allow for the development of machine reasoning.

When a user inputs a set of filters, the logic can be translated to filtering queries. There are similarities between query languages (SQL and Graph Query) and reasoning declaratives. In this case, operators can enter those specific instances and enter training mode to define a reasoning step based on analytical model. The user provides a set of known instance mapping and select types of analytical model to train the AI. The system can construct analytical models (human override available, either supply type of model, or supply human developed model) for training. The training process may use human-in-the-loop techniques and/or similar Weak-Supervision technique.

Based on operator input, automatic reasoners can check the validity and logical equivalence of existing operations and AI task blocks. In addition, via data profiling, the system can identify data linkages between previously unrelated data sources, based on similarity in outputs. For example, AI task blocks A, and B may be provided to the system repository from two different systems. The system may perform reasoning on AI task block A to produce AI task block C. After data profiling AI task block C, the system may determine that C is highly similar to AI task block B. Accordingly, the system may recommend B as a deployment option rather than recommending training A to produce C.

Operators may perform analysis of information by forming a reasoning network or called causal graph. An operator can click and drag AI task blocks onto a "Canvas". Users can provide information between AI task blocks as reasoning steps. In addition to user provided reasoning, system can perform structural/representation learning given the graph and data set.

Analytical models may be developed with intrinsic assumptions about the underlying data. However, the data may model change over time. The resulting model may be re-developed or re-configured with human intervention. With the prior two capabilities in place, the system can explore to keep models re-usable and/or updated without much human intervention.

If an AI task block receives two conflicting modifications, the system may generate a core concept that captures the common piece of the two modifications, then derive two sub-blocks from the core concept, which may be implemented using super-classing.

In some cases, a reasoning rule may be defined as a technique that takes a set of input types and produces a set of output types. In some cases, strict typing may be enforced to create delineated definitional boundaries.

Two AI task blocks present in the same type of data class definition (e.g., string, integer, double, or other data class), may not necessarily have the same type of data (e.g., name, age, or other demographic data) or even the same distribution of data (e.g., the population of California vs the population of the United Kingdom). Strong type enforcement may result in reduced re-use, but provides clarity in the operation of typing rules. When an AI task block receives an update in its definition, the automatic reasoner may checks for compatibility. The automatic reasoner may raise an error if such an update causes some underlying assumptions/signature of the data to change.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

Various implementations have been specifically described. However, other implementations that include a fewer, or greater, number of features and/or components for each of the apparatuses, methods, and/or other embodiments described herein are also possible.

What is claimed is:

1. A method comprising:
   at a capture layer of a model repository stack:
     accessing, via network interface circuitry, a project knowledge graph, the project knowledge graph including nodes representing multiple tasks, the multiple tasks determined via deconstruction of an end-to-end artificial intelligence (AI) application into the multiple tasks; and
     for an individual one of the multiple tasks, at classification circuitry:
       traversing the project knowledge graph to determine a corresponding AI task block including contextualized execution code, the contextualized execution code configured to perform the individual one of the multiple tasks in a specific context defined for the AI application on the project knowledge graph;
       capturing a portion of the specific context from the project knowledge graph; and
       after a determination that capture of the specific context was incomplete, re-traversing the project knowledge graph to capture an additional portion of the specific context;
   at a repository graph layer of the model repository stack:
     for the corresponding AI task block:
       storing the corresponding AI task block in a repository;

importing the portion of the specific context to a repository knowledge graph by appending a portion of the project knowledge graph to the repository knowledge graph;

applying a first descriptor rule to the to the portion of the specific context to determine that the capture of the specific context was incomplete; and after the capture is completed, expanding the repository knowledge graph to include the additional potion of the specific context;

associating the corresponding AI task block with an AI classification based on the individual one of the multiple tasks and the specific context;

at a deployment layer of the model repository stack;

based on the AI classification, the specific context, the individual one of the multiple tasks, or a combination thereof, returning the corresponding AI task block as an option in response to a query; and sending the corresponding AI task block to a requester responsive to a selection of the option.

2. The method of claim 1 further including expanding the AI classification to cover the individual one of the multiple tasks, the specific context, or both.

3. The method of claim 2 where expanding the AI classification includes super-classing an existing class by defining a super-class covering the existing class as a subclass and the corresponding AI task block, the specific context, or both outside the subclass.

4. The method of claim 3, where super-classing further includes causing reverse-inheritance of parameters from the subclass to the super-class upon creation of the super-class.

5. The method of claim 4, further causing forward-inheritance of parameters from the super-class to the subclass for parameters applied after creation of the super-class.

6. The method of claim 3, further including determining not to reverse-inherit a selected parameter from the subclass responsive to the specific context, the corresponding AI task block, or both.

7. The method of claim 1, where applying the first descriptor rule includes traversing the specific context across a transformation from an input type to an output type.

8. The method of claim 7, where the determination that the capture of the specific context was incomplete includes determining that a node for the transformation, a node for the input type, a node for the output type, or any combination thereof is missing from the portion of the specific context.

9. The method of claim 8, further comprising identifying a node missing from the portion based on a node present in the portion that is part of an incomplete input-transformation-output tuple.

10. The method of claim 1, before returning the corresponding AI task block as an option in response to the query, determining to respond to the query with an AI task block associated with the AI classification.

11. The method of claim 10, before returning the corresponding AI task block as an option in response to the query:

evaluating AI task blocks associated with the AI classification including the corresponding AI task block; and determining a structural similarity between the corresponding AI task block and a term from the query.

12. A system comprising:

network interface circuitry configured to:

at a capture layer of a model repository stack:

accessing, via network interface circuitry, a project knowledge graph, the project knowledge graph including nodes representing multiple tasks, the multiple tasks determined via deconstruction of an end-to-end artificial intelligence (AI) application into the multiple tasks; and classification circuitry in data communication with the network interface circuitry, the classification circuitry configured to:

at the capture layer:

for an individual one of the multiple tasks:

traversing the project knowledge graph to determine a corresponding AI task block including contextualized execution code, the contextualized execution code configured to perform the individual one of the multiple tasks in a specific context defined for the AI application on the project knowledge graph;

capturing a portion of the specific context from the project knowledge graph; and after a determination that capture of the specific context was incomplete, re-traversing the project knowledge graph to capture an additional portion of the specific context;

at a repository graph layer of the model repository stack:

for the corresponding AI task block:

storing the corresponding AI task block in a repository;

importing the portion of the specific context to a repository knowledge graph by appending a portion of the project knowledge graph to the repository knowledge graph;

applying a first descriptor rule to the to the portion of the specific context to determine that the capture of the specific context was incomplete; and after the capture is completed, expanding the repository knowledge graph to include the additional potion of the specific context;

associating the corresponding AI task block with an AI classification based on the individual one of the multiple tasks and the specific context;

deployment circuitry configured to:

at a deployment layer of the model repository stack;

based on the AI classification, the specific context, the individual one of the multiple tasks, or a combination thereof, returning the corresponding AI task block as an option in response to a query; and sending, via the network interface circuitry, the corresponding AI task block to a requester responsive to a selection of the option.

13. The system of claim 12, where the classification circuitry is further configured to expand the AI classification to cover the individual one of the multiple tasks, the specific context, or both.

14. The system of claim 13 where the classification circuitry is further configured to expand the AI classification by super-classing an existing class by defining a super-class covering the existing class as a subclass and the corresponding AI task block, the specific context, or both outside the subclass.

15. The system of claim 14, where the classification circuitry is further configured to super-class by causing reverse-inheritance of parameters from the subclass to the super-class upon creation of the super-class.

16. The system of claim 15, where the classification circuitry is further configured to cause forward-inheritance of parameters from the super-class to the subclass for parameters applied after creation of the super-class.

17. The system of claim 14, further including determining not to revere-inherit a selected parameter from the subclass responsive to the specific context, the corresponding AI task block, or both.

18. A product comprising:
machine-readable media other than a transitory signal; and
instructions stored on the machine-readable media, the instructions configured to cause a machine to:
   at a capture layer of a model repository stack:
      access, via network interface circuitry, a project knowledge graph, the project knowledge graph including nodes representing multiple tasks, the multiple tasks determined via deconstruction of an end-to-end artificial intelligence (AI) application into the multiple tasks; and
      for an individual one of the multiple tasks, at classification circuitry:
         traverse the project knowledge graph to determine a corresponding AI task block including contextualized execution code, the contextualized execution code configured to perform the individual one of the multiple tasks in a specific context defined for the AI application on the project knowledge graph;
         capture a portion of the specific context from the project knowledge graph; and
         after a determination that capture of the specific context was incomplete, re-traverse the project knowledge graph to capture an additional portion of the specific context;
   at a repository graph layer of the model repository stack:
      for the corresponding AI task block:
         store the corresponding AI task block in a repository;
         import the portion of the specific context to a repository knowledge graph by appending a portion of the project knowledge graph to the repository knowledge graph;
         apply a first descriptor rule to the to the portion of the specific context to determine that the capture of the specific context was incomplete; and
         after the capture is completed, expand the repository knowledge graph to include the additional potion of the specific context;
         associate the corresponding AI task block with an AI classification based on the individual one of the multiple tasks and the specific context;
   at a deployment layer of the model repository stack;
      based on the AI classification, the specific context, the individual one of the multiple tasks, or a combination thereof, return the corresponding AI task block as an option in response to a query; and
      send the corresponding AI task block to a requester responsive to a selection of the option.

19. The product of claim 18, where the instructions are further configured to cause the machine to: before returning the corresponding AI task block as an option in response to the query, determine to respond to the query with an AI task block associated with the AI classification.

20. The product of claim 19, where the instructions are further configured to cause the machine to:
before returning the corresponding AI task block as an option in response to the query:
   evaluate AI task blocks associated with the AI classification including the corresponding AI task block; and
   determine a structural similarity between the corresponding AI task block and a term from the query.

* * * * *